May 19, 1959     J. L. EVANS     2,887,404
COMPOSITION
Filed March 22, 1956
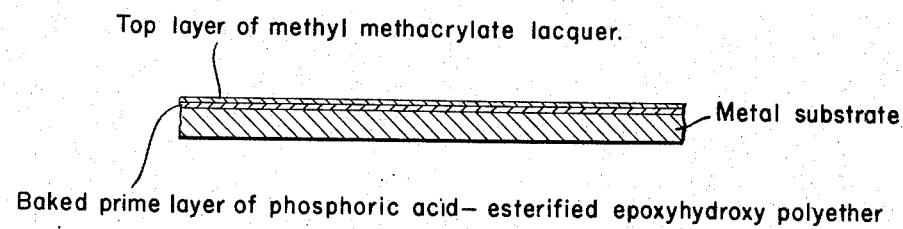
Top layer of methyl methacrylate lacquer.
Metal substrate.
Baked prime layer of phosphoric acid— esterified epoxyhydroxy polyether resin.
*INVENTOR*
JOHN L. EVANS
BY *Ernest H. Beck*
ATTORNEY United States Patent Office 2,887,404
Patented May 19, 1959

2,887,404

COMPOSITION

John L. Evans, Springfield, Pa., assignor to E. I. du Pont de Nemours and Company, Wilmington, Del., a corporation of Delaware Application March 22, 1956, Serial No. 573,222

3 Claims. (Cl. 117—75)

This invention relates to finishing systems for metal. More particularly, it relates to metal articles having a multiple layer coating comprising an undercoat obtained from a liquid coating composition containing a phosphoric acid-esterified epoxyhydroxy polyether resin of specified character as its principal organic film-forming material and in direct contact therewith a superposed topcoat obtained from a methyl methacrylate lacquer.

Dry films or coatings obtained from the application of a liquid coating composition containing a solvent and as the principal film-forming constituent a polymer of methyl methacrylate, that is, obtained from the application of what is termed herein a methyl methacrylate lacquer, are known generally to have outstanding durability and gloss retention. Unfortunately, such films do not inherently possess the high level of metal-protecting and rust-inhibiting properties required for coating metal which is to be used outdoors, for example, steel automobile bodies. It is, therefore, necessary that for such usage a coating of metal-protecting or rust-inhibiting material be applied to the metal before applying a topcoat of methyl methacrylate lacquer.

Coating compositions applied directly to metal to serve as undercoats for the purpose of providing metal protection and rust inhibition are commonly known as primers and the dry coat resulting from application of such materials is commonly referred to as the primer coat or prime coat. The conventional primers such as those commonly used under alkyd resin enamels, amino-aldehyde resin enamels, or nitrocellulose lacquer topcoats are not satisfactory for use immediately under methyl methacrylate lacquer topcoats.

More specifically, the durability advantages of topcoats obtained from methyl methacrylate lacquers cannot be fully realized using the conventional metal primers because of metal-to-primer or primer-to-topcoat relations which cause a failure in the finishing system before the topcoat alone has failed to the same stage of non-serviceability. In particular, finishing systems comprising a methyl methacrylate topcoat, that is, a dry film obtained by application of a methyl methacrylate lacquer, over a conventional prior art metal primer have one or more of such deficiencies as poor adhesion of the primer-to-metal, poor adhesion of the topcoat to the primer, and cracking (i.e., development of fissures) of the topcoat or the finishing system.

I have discovered metal finishing systems utilizing a methyl methacrylate topcoat which do not have the aforementioned serious defects. In the finishing systems of my invention there is used, to provide an undercoat for a methyl methacrylate topcoat, a liquid coating composition containing as the principal organic film-forming material an epoxyhydroxy polyether resin esterified with 1%–7.5% by weight, based on said resin, of a phosphoric acid. Said undercoat composition is baked prior to application of the methyl methacrylate lacquer.

The phosphoric acid-esterified epoxyhydroxy polyether resin undercoat composition can be, and preferably is, used as a primer, that is, it is applied directly to the metal. Alternatively, it can be used to provide a coating or layer intermediate the methyl methacrylate topcoat and a different primer or undercoat material. However whether it be used as a primer or to provide a coating intermediate a prime coat and a methyl methacrylate topcoat, the important requirement of the present invention is that the topcoat of methyl methacrylate be in direct and adherent contact with it.

In the drawing there is illustrated an enlarged cross sectional view of a representative portion of a coated metal article of the invention.

Epoxyhydroxy polyether resins used in making the phosphoric acid-esterified film-forming component used in the undercoat for methyl methacrylate topcoat in the finishing systems of the invention are, as the term itself indicates, polymers having a plurality of ether oxygen atoms per molecule as well as being characterized by epoxy and hydroxy groups.

The epoxyhydroxy polyether resins can be readily prepared in accordance with known practices by condensing a polyhydric phenol with an epihalohydrin or a polyepoxy compound. For example, U.S. Patents 2,503,726, 2,582,985, 2,592,560 and 2,694,694 show methods for the preparation of epoxyhydroxy polyether resins. An example of such a polyether resin containing epoxy and hydroxy groups is the product obtained by condensing two mols of epichlorohydrin with one mol of the compound frequently referred to as either bis-phenol or diphenylol propane, and more specifically as 2,2-bis(p-hydroxyphenyl)propane. Many other examples are given in the aforementioned patents. Epoxyhydroxy polyether resins are currently marketed by a number of suppliers. Some, for example, are marketed under the proprietary names "Epon" (Shell Chemical Corp.), and "Araldite" (Ciba Company, Inc.).

The polyhydric phenol reactant used in making the epoxyhydroxy polyether resins can be varied widely as shown in the aforementioned patents. Illustrative of the phenols are resorcinol, hydroquinone, catechol, diphenylol propane, p,p-dihydroxydiphenyl, and the analogous polyhydric anthracenes and naphthalenes. Diphenylol propane is a preferred polyhydric phenol reactant.

Illustrative of epoxyhydroxy contributing compounds for condensation with the polyhydric phenols are epichlorohydrin, epibromohydrin, epihalohydrins of mannitol, sorbitol and erythritol, glycerol dichlorohydrin, butylene diepoxide, bis(2,3-epoxypropyl)ether, and diepoxides of mannitol and sorbitol. Still others are specifically illustrated in the aforementioned patents. Epichlorohydrin is a preferred species.

The preferred epoxyhydroxy polyether resins for use in making the undercoat compositions employed in preparing the finishing systems of this invention contain on the average more than one epoxy group and more than one hydroxy group per molecule.

The reaction of phosphoric acid with the polyether resin to give a phosphoric acid-esterified epoxyhydroxy polyether resin of the kind that characterizes the undercoat composition applied in preparing finished systems of the invention proceeds readily in a liquid medium. The order of addition of the reactants and the reaction conditions can be varied as desired. For example, the reaction can be conducted by stirring moderately at room temperature for 4 to 12 hours or can be carried out more rapidly at elevated temperatures as shown in the detailed working examples hereinafter.

Orthophosphoric acid is the preferred phosphoric acid used as the phosphating agent but other acids such as metaphosphoric acid and pyrophosphoric acid can be used. Likewise, partially esterified phosphorus acids such as methyl acid phosphate and butyl acid phosphate can be used.

The phosphoric acid-esterified epoxyhydroxy polyether resins used in the practice of this invention are those which contain from 1 to 7.5% by weight, based upon the weight of the non-phosphated epoxyhydroxy polyether resin, of phosphate calculated as phosphoric acid. This is what is meant by the statement that the esterified resin used is an epoxyhydroxy polyether resin esterified with 1%–7.5% by weight, based on said resin, of phosphoric acid. Since the esterifying reaction can be carried out readily to substantially complete consumption of the phosphoric acid in ester formation, the desired degree of esterification within said range can be readily effected by appropriate proportioning of the phosphoric acid and resin reactants.

Epoxyhydroxy polyether resins esterified with less than 1% of their own weight of phosphoric acid do not provide the degree of topcoat-to-primer adhesion required. Those esterified with more than 7.5% of their own weight of phosphoric acid do not provide additional advantages commensurate with the increased acid content and in general possess some undesirable properties.

The preferred epoxyhydroxy polyether resins used are those which have been esterified with from about 2% to 5% by weight, based on the weight of the resin, of phosphoric acid.

The polymers of methyl methacrylate useful in making the methyl methacrylate lacquers employed in preparing the products of the invention are either homopolymers of methyl methacrylate or copolymers of methyl methacrylate with minor amounts, for example, in the order of 2 to 25% by weight, of another material copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile and styrene. A preferred copolymer contains about 98% of methyl methacrylate and 2% methacrylic acid. Thus the term "polymer of methyl methacrylate" and related terms, as used herein, refer to such homopolymers and copolymers as well as mixtures of homopolymers, mixtures of copolymers, and mixtures containing both homopolymer and copolymer.

The preferred methyl methacrylate polymers for use in the methyl methacrylate lacquers are those having a relative viscosity of about 1.117 to 1.196. Methyl methacrylate topcoat lacquers based on such polymers are disclosed and claimed in copending application Serial No. 434,661, filed June 4, 1954, by Laverne W. Crissey and John H. Lowell. Still other methyl methacrylate topcoat lacquers containing such polymers which are particularly adapted to convenient spray application are disclosed and claimed in copending application Serial No. 402,498, filed January 6, 1954, by Laverne W. Crissey and John H. Lowell.

The term "relative viscosity," as used herein to specify a property of polymers of methyl methacrylate, is the value obtained by dividing the efflux time of a solution, A, of the polymer of methyl methacrylate by the efflux time of the solvent, B, used in said solution, the efflux times being measured in accordance with the procedure of A.S.T.M. D-445-46T, Method B, using as polymer solution A, a solution of 0.25 gram of the polymer of methyl methacrylate being tested in 50 cc. of ethylene dichloride, and as the solvent B, ethylene dichloride. The efflux times are determined at 25° C. in a standard apparatus currently marketed under the designation of Modified Ostwald Viscosimeter, Series 50.

The polymers of methyl methacrylate used in making the methyl methacrylate lacquers can be prepared according to well known methods by polymerizing methyl methacrylate monomer with or without another monomer copolymerizable therewith either in bulk, in solution, or in granular form to produce products having the required relative viscosity.

The methyl methacrylate lacquer compositions and the phosphoric acid-esterified epoxyhydroxy polyether resin coating compositions employed in making the articles of the invention will contain a solvent and, unless a clear coating is desired, will also contain pigments, and they can also contain other conventional modifiers for coating compositions such as plasticizers, inhibitors, dispersing agents, flow control agents, and the like.

Examples of volatile solvents and diluents which can be used in formulating the phosphated undercoat composition and methyl methacrylate lacquer topcoat composition are toluene, xylene, butyl acetate, acetone, methyl isobutyl ketone, butyl ether, and other aliphatic, cycloaliphatic, and aromatic hydrocarbons, esters, ethers, ketones, and alcohols such as are conventionally used in coating compositions.

Examples of the great variety of pigments which can be used in making the undercoat and topcoat compositions employed in this invention are titanium dioxide, carbon black, silica, china clay, talc, metallic oxide, silicates, chromates, sulfides, sulfates, and organic pigments. The pigments are, of course, used in proportions normally used in undercoat and topcoat compositions.

Altho the preferred undercoat compositions for methyl methacrylate topcoats contain the phosphoric acid esterified epoxyhydroxy polyether resin as the sole organic film-forming material, minor amounts of other organic film-forming materials compatible therewith can be included in the undercoat compositions, such as plasticizers, oil modified alkyd resins, alkylated amino aldehyde resins, and phenol aldehyde resins.

Any of the plasticizers for polymers of methyl methacrylate can be used in the methyl methacrylate lacquer. The preferred plasticizer from the standpoint of best overall balance of properties is benzyl butyl phthalate. Other plasticizers which aid in providing dry films having especially desirable properties are dibutyl phthalate, triphenyl phosphate, 2-ethylhexyl benzyl phthalate, and dicyclohexyl phthalate.

The coated articles of the invention are prepared in a preferred embodiment by applying the phosphoric acid esterified epoxyhydroxy polyether resin undercoat composition directly to the metal article as a primer, baking it to produce a hard adherent layer, applying directly thereover a methyl methacrylate lacquer composition and drying the latter. The phosphoric acid-esterified undercoating is preferably baked, prior to the topcoat application, on schedules varying from 2 hours at about 300° F. to 10 minutes at 425° F. altho it will be apparent that other baking times and temperatures can be used to give a thoroughly dry and hard coat.

The finishing systems of this invention are useful for obtaining outstanding outdoor durability from methyl methacrylate topcoats on metal articles, which advantage has not been possible thru the application of methyl methacrylate lacquer topcoats directly over prior art primers. The finishing systems are particularly useful on steel automobile bodies.

In order that the invention may be better understood, the following examples illustrating articles of the invention, their preparation and use are given in addition to the examples already given above. Parts and percentages are by weight unless otherwise indicated.

EXAMPLE 1

*Preparation of esterified epoxyhydroxy polyether resin*

An epoxyhydroxy polyether resin was esterfied as follows with 2.4% of phosphoric acid, based on the weight of the resin.

1500 parts of an epoxyhydroxy polyether resin composition consisting essentially of a polymeric condensation product of diphenylol propane and epichlorohydrin, having a melting point in the range of 145°–155° C. and an epoxide equivalent in the range of 2400–4000, and currently marketed under the proprietary name of "Epon" 1009, was dissolved in 1500 parts of ethylene glycol monobutyl ether with stirring at 70° C.

After cooling the solution of the resin to 45° C., a solution of 43 parts of aqueous 85% ortho-phosphoric acid in 37 parts of ethylene glycol monobutyl ether was added. The resulting batch was stirred at 45° C. for one hour, then at 60°–80° C. for one hour, and then cooled to room temperature.

*Preparation of liquid undercoat composition*

An undercoat composition was prepared by mixing the following ingredients and grinding them in conventional paint grinding apparatus until a smooth dispersion was produced.

| | Parts |
|---|---|
| Phosphoric acid-esterified resin composition produced above | 36.5 |
| Titanium dioxide pigment | 30.2 |
| Di-2-ethylhexylamine | 2.3 |
| Ethylene glycol monobutyl ether | 31.0 |
| | 100.0 |

*Preparation of topcoat composition*

A methyl methacrylate lacquer composition was prepared by mixing the following ingredients and grinding them in conventional paint grinding apparatus until a smooth uniform dispersion was obtained.

| | Parts |
|---|---|
| Homopolymer of methyl methacrylate | 29.74 |
| Dibutyl phthalate | 11.93 |
| Titanium dioxide | 7.16 |
| Carbon black | 0.07 |
| Ferrite yellow | 0.98 |
| Red iron oxide | 0.12 |
| Toluol | 25.00 |
| Xylol | 25.00 |
| | 100.00 |

The homopolymer of methyl methacrylate employed in making this lacquer had a relative viscosity of about 1.142 as measured according to A.S.T.M. D–445–46T, Method B, referred to hereinabove.

*Preparation of coated article*

The liquid undercoat composition described above was thinned to spraying viscosity and was then applied by spraying to duplicate auto body steel panels, which had previously been treated with a conventional rust inhibitor ("Bonderite," a product of Parker Rust-Proof Co.), in sufficient amount to produce a smooth uniform coating about one mil thick. The wet coated panels were then baked for 15 minutes at 400° F. and then allowed to cool to room temperature.

The methyl methacrylate lacquer, described above, was then thinned to spraying viscosity and sprayed over the auto body panels primed with the esterified resin undercoat, as described above, in sufficient amount to yield a smooth uniform coating about 2 mils thick. The wet topcoated panels were then baked for 20 minutes at 180° F. to speed the drying, which at room temperature would have required 16 to 24 hours. The resulting coatings were smooth, uniform, hard and glossy.

*Evaluation of the coated article*

One of the panels coated as described above was tested for the important property of resistance to cracking. This was done by exposing it outdoors in Florida for 8 months. The panel coating was found to be entirely free of cracks after this period of weathering.

The other coated panel was tested for the important properties of adhesion of the primer to the metal panel and adhesion of the top layer to the primer by cutting two two-inch long marks in the form of an X vertically thru the coating down to the metal, securely pressing a strip of pressure-sensitive cellophane adhesive tape over the X and then pulling the adhesive tape off with a jerk.

It was found in the adhesive tape-jerk-test that the methyl methacrylate lacquer topcoat was not stripped from the undercoat nor was the undercoat stripped from the metal; in other words, that the topcoat adhered well to the undercoat and the undercoat adhered well to the metal. In contrast, in like tests made on applications of the same methyl methacrylate lacquer topcoat over a variety of commonly used and widely accepted prior art steel primer compositions on steel, it was found that the topcoat was easily stripped from the prime coat.

EXAMPLE 2

In this example, an epoxyhydroxy polyether resin was esterified with 3.92% of phosphoric acid based on the weight of the resin.

The esterified resin was prepared according to the procedure described in Example 1 using ingredients in the amount shown below, the resin composition used consisting essentially of the polymeric condensation product of diphenylol propane and epichlorohydrin, having a melting point in the range of 127°–133° C., and an epoxide equivalent in the range of 1550–2000, and being currently marketed under the proprietary name of "Epon" 1007.

| | Parts |
|---|---|
| Epoxyhydroxy polyether resin | 1500 |
| Methyl ethyl ketone | 1558 |
| Aqueous 85% H$_3$PO$_4$ | 69 |

The esterified resin was formulated according to Example 1 to provide an undercoat composition. The use of this undercoat composition as a primer in a finishing system, otherwise as described in Example 1, resulted in a system having topcoat-to-primer adhesion equivalent to that obtained with the system described in that example.

EXAMPLE 3

In this example, an epoxyhydroxy polyether resin was esterified with 4.46% by weight of phosphoric acid based on the weight of the resin.

The resin used was the same as in Example 2. The esterified resin was prepared according to the procedure described in Example 1 using ingredients in the following amounts.

| | Parts |
|---|---|
| Epoxyhydroxy polyether resin | 1500 |
| Methyl ethyl ketone | 1570 |
| Aqueous 85% H$_3$PO$_4$ | 82 |

When the esterified resin was formulated, as described in Example 1, to provide an undercoat composition and that composition was applied as a prime coat on metal in the preparation of a finishing system according to the method described in Example 1, improved topcoat-to-primer adhesion was obtained equivalent to that obtained with the undercoat composition described in that example.

EXAMPLE 4

In this example, an epoxyhydroxy polyether resin of the kind used in Example 2 was esterified with 4.86% of phosphoric acid based on the weight of the resin.

The esterified resin was prepared according to the procedure described in Example 1 using ingredients in the following amounts.

| | Parts |
|---|---|
| Epoxyhydroxy polyether resin | 1500 |
| Methyl ethyl ketone | 1242 |
| Aqueous 85% H$_3$PO$_4$ | 86 |

The esterified resin was formulated according to Example 1 to provide an undercoat composition. The use of this undercoat composition as a primer in a finishing system, otherwise as described in Example 1, resulted in a system having topcoat-to-primer adhesion equivalent to that obtained with the system described in that example.

EXAMPLE 5

In this example, an epoxyhydroxy polyether resin like that used in Example 2 was esterified with 5.77% of phosphoric acid based on the weight of the resin.

The esterified resin was prepared according to the procedure described in Example 1 using ingredients in the following amounts.

| | Parts |
|---|---|
| Epoxyhydroxy polyether resin | 1500 |
| Methyl ethyl ketone | 1586 |
| Aqueous 85% $H_3PO_4$ | 102 |

When the esterified resin was formulated as described in Example 1 to provide an undercoat composition and that composition was applied as a prime coat on metal in the preparation of a finishing system according to the method described in Example 1, improved topcoat-to-primer adhesion was obtained equivalent to that obtained with the undercoat composition described in that example.

EXAMPLE 6

The following is a formula for a liquid undercoat composition made as described in Example 1 but omitting an optional additive used therein, namely, di-2-ethylhexylamine.

| | Parts |
|---|---|
| Phosphoric acid-esterified resin of Example 4 | 28.0 |
| Titanium dioxide pigment | 38.7 |
| Ethylene glycol monobutyl ether | 33.3 |
| | 100.0 |

A metal article primed with this composition and topcoated with a methyl methacrylate lacquer, as described in Example 1, shows the improved topcoat-to-primer adhesion which is characteristic of the finishing systems of this invention.

The foregoing detailed description has been given for clearness of understanding only and no unnecessary limitations are to be understood therefrom. The invention is not limited to the exact details shown and described for obvious modifications will appear to those skilled in the art without departing from the spirit and scope thereof; and, therefore, the invention is not intended to be limited except as indicated in the appended claims.

I claim:
1. A metal article having a multiple layer coating comprising an undercoat and a superposed dried topcoat of a methyl methacrylate lacquer in adherent contact therewith, said undercoat being a baked layer of a coating composition comprising as the principal film-forming material epoxyhydroxy polyether resin esterified with 1%–7.5% by weight, based on said resin, of a phosphoric acid.

2. A metal article having a multiple layer coating comprising a prime coat and in adherent contact therewith a superposed dried topcoat of methyl methacrylate lacquer in which the methyl methacrylate polymer component of said lacquer has a relative viscosity of 1.117–1.196, said prime coat being a baked layer of a liquid coating composition comprising pigment, solvent, and as the principal film-forming material an epoxyhydroxy polyether resin esterified with 1%–7.5% by weight, based on said resin, of a phosphoric acid.

3. A metal article having a multiple layer coating comprising a prime coat and in adherent contact therewith a superposed dried topcoat of methyl methacrylate lacquer in which the methyl methacrylate polymer component of said lacquer has a relative viscosity of 1.117–1.196, said prime coat being a baked layer of a liquid coating composition comprising pigment, solvent, and as the principal film-forming material an epoxyhydroxy polyether resin which is a condensation product of diphenylol propane and epichlorohydrin esterified with 2%–5% by weight, based on the weight of said resin, of a phosphoric acid.

References Cited in the file of this patent

UNITED STATES PATENTS

| 2,541,027 | Bradley | Feb. 13, 1951 |
| 2,703,765 | Osdal | Mar. 8, 1955 |
| 2,723,971 | Cupery | Nov. 15, 1955 |
| 2,782,131 | Johnson | Feb. 19, 1957 |

FOREIGN PATENTS

| 129,292 | Australia | Apr. 5, 1945 |